A. H. VAN PELT.
ELECTRIC WATER PURIFIER.
APPLICATION FILED JUNE 29, 1912.

1,057,367.

Patented Mar. 25, 1913.
2 SHEETS—SHEET 1.

Witnesses:

Inventor:
A. H. Van Pelt

UNITED STATES PATENT OFFICE.

ADA H. VAN PELT, OF LOS ANGELES, CALIFORNIA.

ELECTRIC WATER-PURIFIER.

1,057,367. Specification of Letters Patent. Patented Mar. 25, 1913.

Application filed June 29, 1912. Serial No. 706,775.

*To all whom it may concern:*

Be it known that I, ADA H. VAN PELT, a citizen of the United States, and resident of Los Angeles, in the county of Los Angeles and State of California, have invented certain new and useful Improvements in Electric Water-Purifiers, of which the following is a specification.

My invention pertains to water purifying apparatus, and it has special reference to mechanism for purifying water by electrolysis, and the device is of such a character as to be portable and applicable for use in small vessels, so as to adapt it for domestic and other uses.

The invention comprises a metallic disk which also serves as a base, which has centrally an upwardly-projecting tubular stem, preferably of insulating material, this stem carrying thereon a vertically-adjustable spider, the arms of which are of suitable metal, and in connecting up the base thus formed and the spider with a suitable source of electricity, so that when the device thus constructed is immersed in water and a current sent through the said electrodes, the usual electrolytic effect will be produced in the water, and the same purified in a manner well known to the art.

It also provides a means whereby, instead of filtering the product, a reservoir may be used in connection with the purifier, which will catch the precipitate, and thus enable the water to be drawn therefrom at any time after the water has been purified, all of which will now be set forth in detail.

Figure 1:
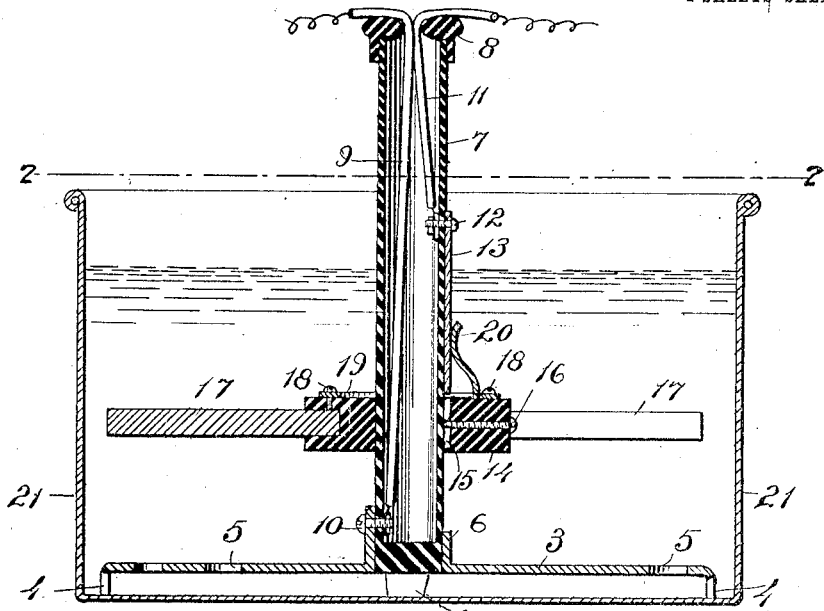
Figure 2:
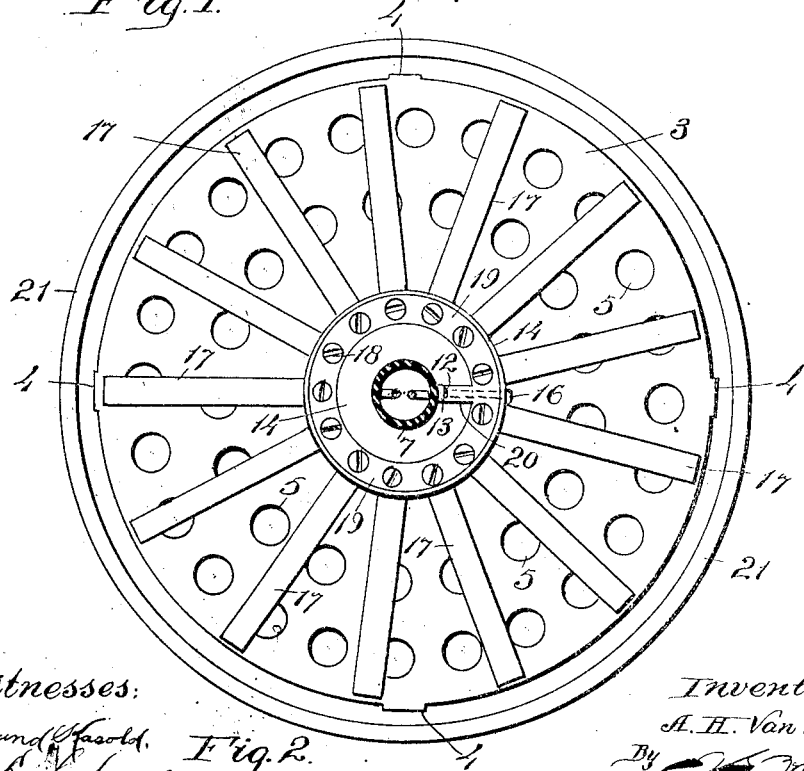
Figure 3:
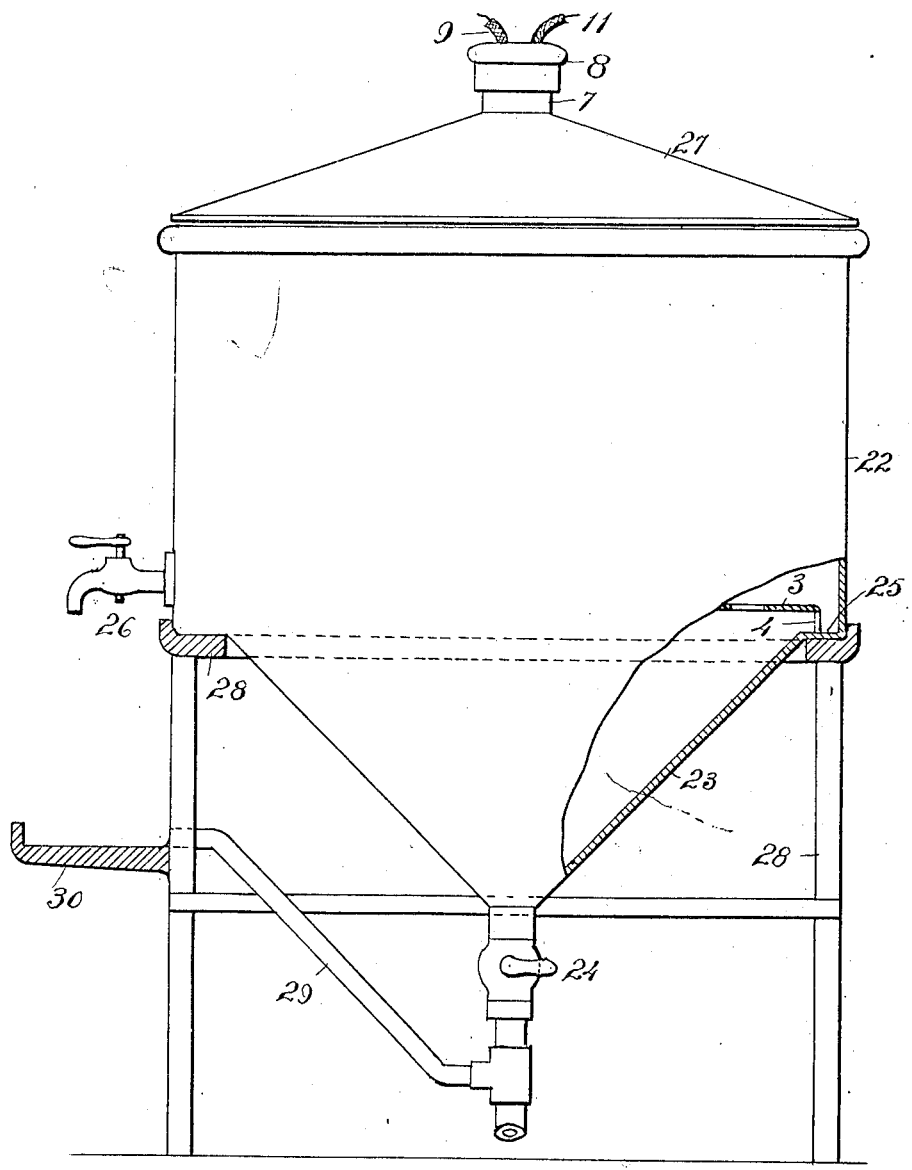

In the accompanying drawing, Figure 1 is a central vertical section of a vessel, and my improved electrolytic water purifier contained therein. Fig. 2 is a top view of the device, the upwardly-projecting tubular stem being shown in horizontal section on line 2 of Fig. 1, and Fig. 3 is a side view partly in section of the receiver to contain the purifier.

In carrying out my invention, I construct a disk 3, preferably of aluminum, of any suitable diameter, which has, for convenience, a set of down-turned members 4 to serve as legs, so that it may be slightly elevated above the base which supports the device. This has a plurality of perforations 5 therein so water may freely circulate from one side to the other.

Centrally the disk has a hole and an upturned annular flange 6, surrounding the hole, adapted to receive therein the lower end of a tubular stem 7. This stem may or may not be of insulating material, but in this instance, I show it made preferably of hard rubber, the upper end being open and designed to receive a removable head 8, through which the inlet wires pass. One of these inlet wires 9 passes down through the tube and is held by a screw 10 which passes through the flange 6 of the disk 3, and the other wire conductor 11, connects through the screw 12, with a metal contact bar 13 which is secured to the outer surface of the tubular stem for purposes which will be hereinafter explained. On this stem is mounted a vertically movable and adjustable spider, this spider being preferably in the shape of a circularly-formed body of insulating material 14, which has a vertical notch 15, within the hole, so as to clear the contact bar 13 on the side of the stem. This body has a set screw 16 through one side, which is designed to have its end contact with the tubular stem, so as to provide means for vertically adjusting the spider, and thus enable me to provide a means for regulating the distance between the spider and base disk.

The body 14 has secured therein a plurality of radiating arms 17, of any suitable metal or conductor of electricity, each arm being held in place by a set screw 18, each set screw passing through a ring 19 on the upper side of the body 14, so that the arms are thus electrically in contact therewith. At one side, the metal ring has an upwardly-projecting contact finger 20 to engage with the vertically-disposed contact bar on the outside of the stem.

From the foregoing it will be seen that one conductor is in electrical contact with the base, which base constitutes one of the terminals, and the other conductor is electrically connected with the arms of the spider, so that the latter constitute the other terminal of the electrical device. As the different waters which are to be treated have different resistances, I am enabled by the vertical adjustment of the spider to so fix the distances between the terminals as to give the most effective treatment to the water, and it is also obvious that as different voltages are found in electric systems, it is essential that this adjustable means is a necessary element in providing a device of this character. As the device is applicable for either alternating or direct currents, I separate the terminals much farther apart, when an alternating current is used, so that the terminals may be adjusted to make the water itself act as the resistance, and thus prevent overheating. By this arrangement of the spider terminal it is a comparatively easy matter to remove either of the arms, and replace the same, while the base itself can be replaced with equal facility; without in any manner disturbing the electrical connections.

In use the device thus constructed is designed to be immersed in water contained in any suitable vessel, as at 21, but in order to provide a means whereby no filtration is required, I construct a reservoir 22, which is in the form of a cylindrical shell with a funnel shaped bottom 23, provided with a plug valve 24. The bottom of the shell has a narrow annular ledge 25 on which the legs 4 of the purifier base rest. The object of this funnel-shaped base is to receive the deposition produced by the purifying treatment, and the purified water may be drawn from the reservoir through the cock 26, at the side of the cylinder. The central stem of the purifier passes through the cover 27 of the reservoir and the stem and cover are preferably secured to each other, so that the cover and purifier are both lifted out together. The reservoir thus constructed may be mounted on any suitable stand or base 28, as shown, and in practice a drain pipe 29, from the glass stand 30 may extend down and connect with the discharge pipe of the reservoir below the valve 24.

What I claim as new, is:—

1. In an electric water purifier, a disk of conducting material, serving as a base, and one of the terminals of an electric circuit, a stem of insulating material projecting up centrally from said disk, and a spider comprising a dielectric hub and a plurality of radial removable arms of conducting material, which serve as the other terminal of a circuit, said spider being vertically-adjustable on said stem.

2. In an electric water purifier, a disk on electrically conducting material, having legs and perforated throughout, connected up with a source of electricity, a tubular stem of insulating material projecting up centrally from said disk, and a spider of suitable conducting material, connected up with an electric circuit, and adjustable vertically on said stem.

3. In an electric water purifier, a disk, constituting a base for the device, and one terminal for an electric circuit, an upwardly-projecting tubular stem attached thereto, a hub of insulating material vertically adjustable on said tubular stem, a plurality of radially disposed arms of conducting material projecting from said hub, said arms being electrically connected up and constituting the other terminal in the electric circuit.

4. In an electric water purifier, a disk of conducting material to serve as a base, a tubular stem of insulating material centrally secured to said base and projecting upwardly, closed at its lower end, and having a vertically disposed contact bar on its outer side near its upper end, a hub of insulating material vertically adjustable on said stem, a plurality of radially disposed arms projecting from said hub, a metallic ring on the hub electrically connected with all of said arms, and a finger integral with the ring and in sliding engagement with the contact bar on the tube.

5. In an electric water purifier, a disk having perforations throughout its surface and marginal legs to serve as a base, an upwardly-projecting tubular stem, closed at its lower end, and fixed to said base, a bar of conducting material secured to the outer side of the stem, a hub of insulating material vertically adjustable on said tube, a plurality of radially disposed arms projecting from said hub, a metallic ring on the hub electrically-connected with all of the radial arms, a finger integral with the ring and in sliding contact with the contact bar of the stem, and electrical conductors extending down into the tubular stem and attached to the base disk and contact bar respectively.

Signed at the city of Los Angeles county of Los Angeles State of California, this 22 day of June 1912, in the presence of witnesses.

ADA H. VAN PELT.

Witnesses:
  J. M. BECK,
  EDMUND KASOLD.